(No Model.) 6 Sheets—Sheet 1.

D. B. HASELTON.
MACHINE FOR CUTTING TEETH IN WIRE AND WINDING THE SAME UPON A CYLINDER.

No. 369,851. Patented Sept. 13, 1887.

WITNESSES
INVENTOR
Daniel B. Haselton
per Lemuel W. Serrell
Atty (No Model.) 6 Sheets—Sheet 2.

D. B. HASELTON.
MACHINE FOR CUTTING TEETH IN WIRE AND WINDING THE SAME UPON A CYLINDER.

No. 369,851. Patented Sept. 13, 1887.

WITNESSES.
J. Staub
Chas. H. Smith

INVENTOR
Daniel B. Haselton
per Lemuel W. Serrell
Atty (No Model.) 6 Sheets—Sheet 4.

D. B. HASELTON.
MACHINE FOR CUTTING TEETH IN WIRE AND WINDING THE SAME UPON A CYLINDER.

No. 369,851. Patented Sept. 13, 1887.

WITNESSES
J. Staib
Chas. H. Smith

INVENTOR
Daniel B. Haselton
per Lemuel W. Serrell
atty (No Model.) 6 Sheets—Sheet 5.

D. B. HASELTON.
MACHINE FOR CUTTING TEETH IN WIRE AND WINDING THE SAME UPON A CYLINDER.

No. 369,851. Patented Sept. 13, 1887.

WITNESSES.

INVENTOR
Daniel B. Haselton (No Model.) 6 Sheets—Sheet 6.
D. B. HASELTON.
MACHINE FOR CUTTING TEETH IN WIRE AND WINDING THE SAME UPON A CYLINDER.
No. 369,851. Patented Sept. 13, 1887.
Fig-7-
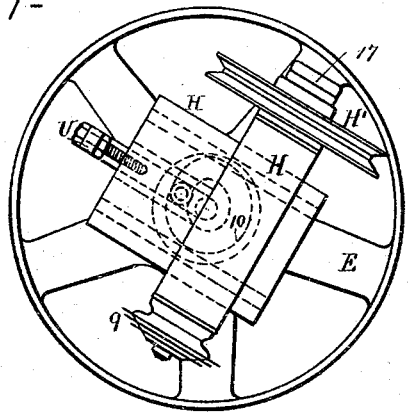
Fig-10-
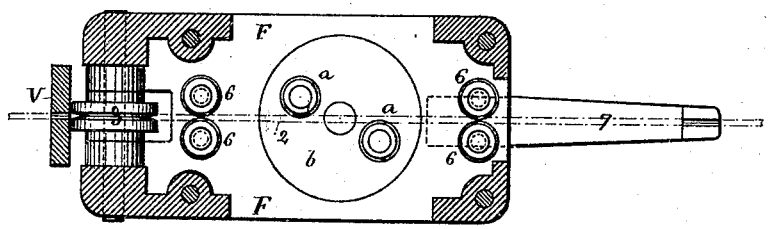
Fig-8-
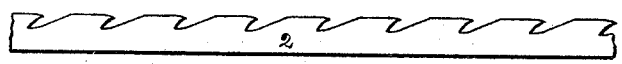
Fig-9-
WITNESSES.
J. Staib
Chas H Smith
INVENTOR.
Daniel B. Haselton
per Lemuel W. Serrell
Atty
N. PETERS, Photo-Lithographer, Washington, D.C.

UNITED STATES PATENT OFFICE.

DANIEL B. HASELTON, OF CHARLESTON, SOUTH CAROLINA.

MACHINE FOR CUTTING TEETH IN WIRE AND WINDING THE SAME UPON A CYLINDER.

SPECIFICATION forming part of Letters Patent No. 369,851, dated September 13, 1887.

Application filed March 28, 1887. Serial No. 232,668. (No model.)

*To all whom it may concern:*

Be it known that I, DANIEL B. HASELTON, of Charleston, in the State of South Carolina, have invented an Improvement in Machinery for Cutting Teeth in Wire and Winding the Same Automatically upon a Cylinder, of which the following is a specification.

The object of this invention is to cut teeth into the edge of a wire similar to that shown in my patent No. 293,576, granted February 12, 1884, and then to wind such wire upon a cylinder to form a ginning or carding cylinder for cotton, wool, or other fibrous material.

In my machine the wire is straightened and the notches are sawed in the thin edge of the triangular wire to form the teeth, the side of the wire is smoothed to remove burrs or projections, the points of the teeth are then bent downwardly, so that the point of each tooth will not project as high as the heel, and then the wire is wound automatically upon the carding or ginning cylinder.

Figure 1:
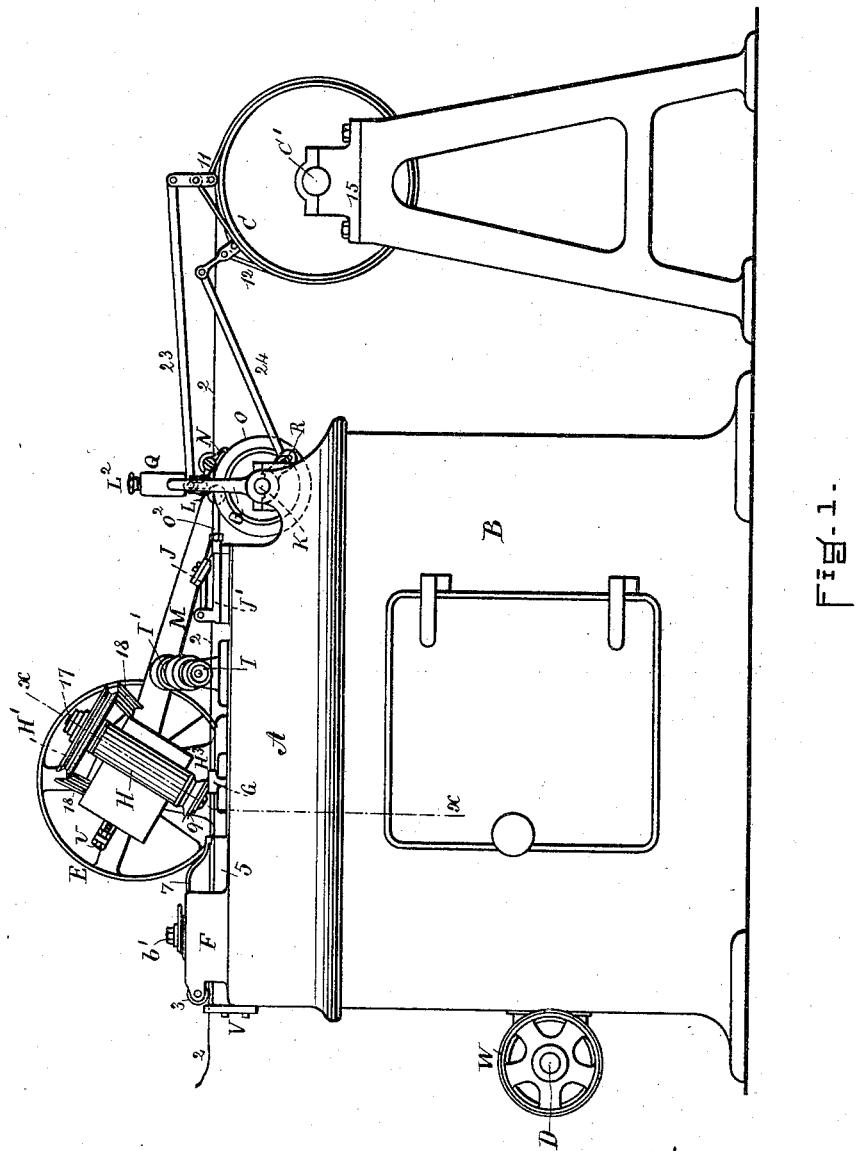
Figure 2:
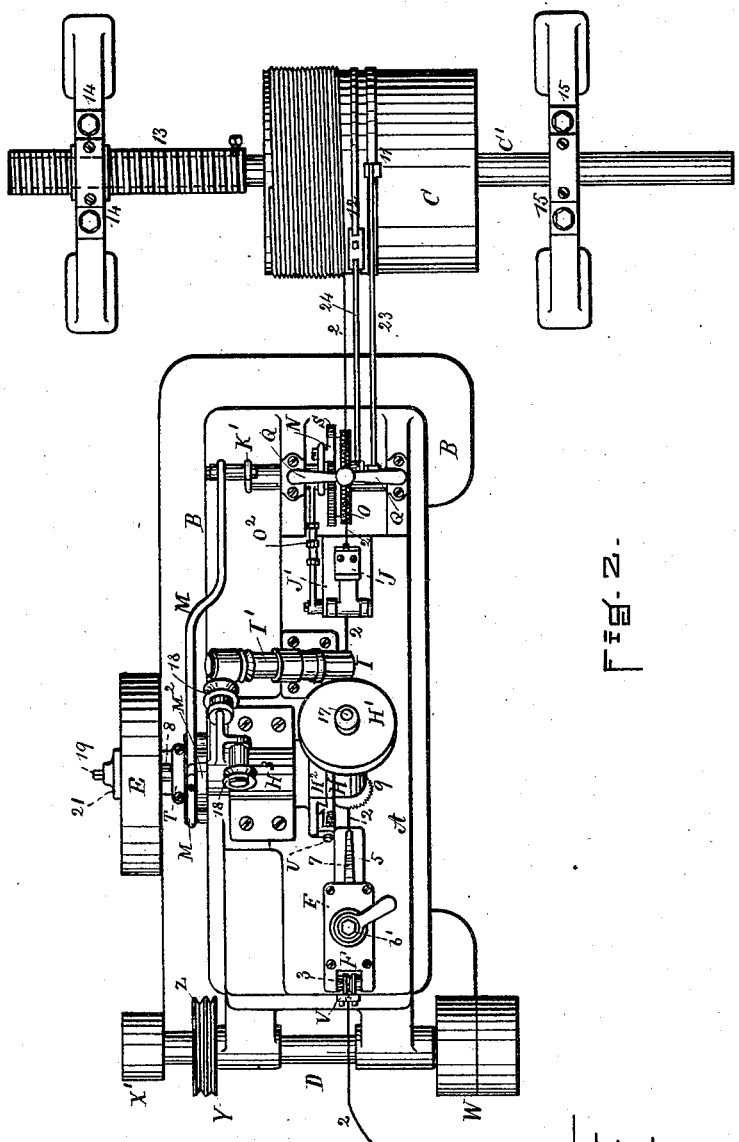
Figure 3:
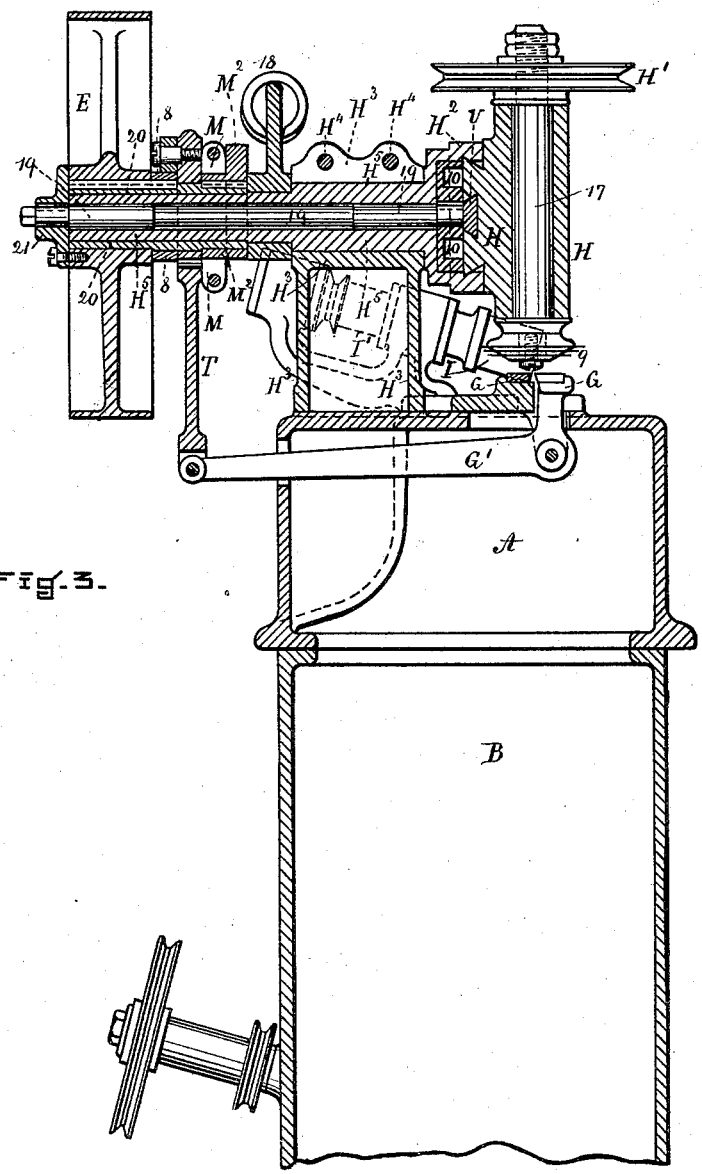
Figure 4:
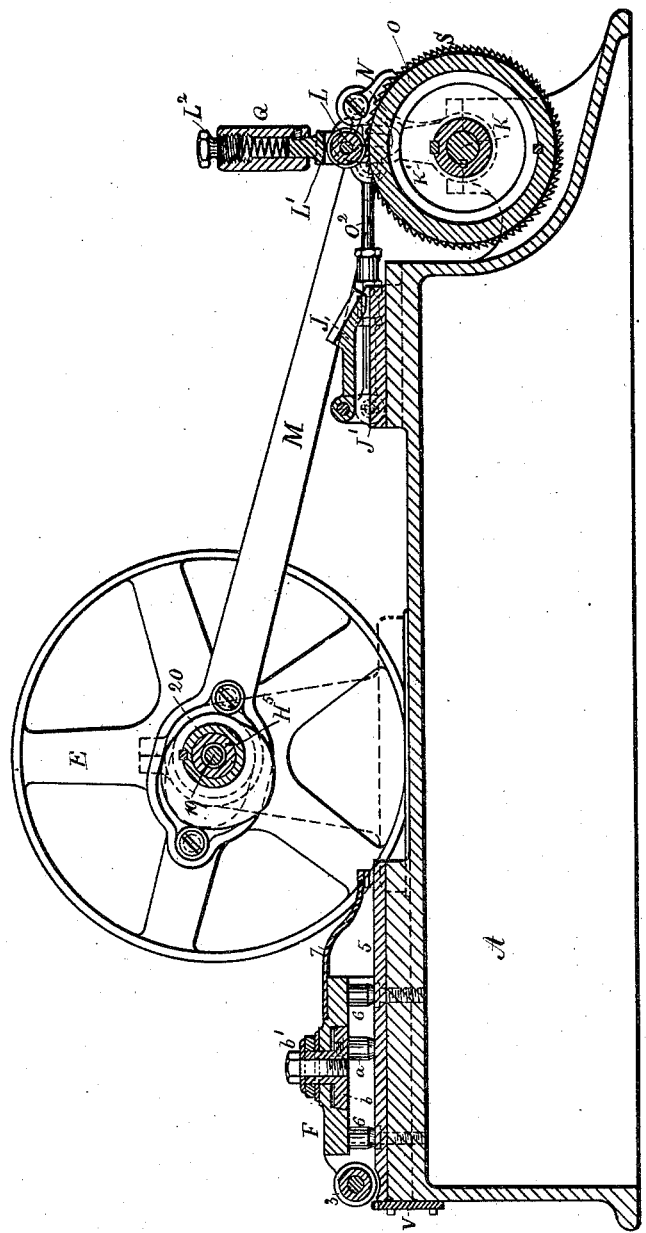
Figure 5:
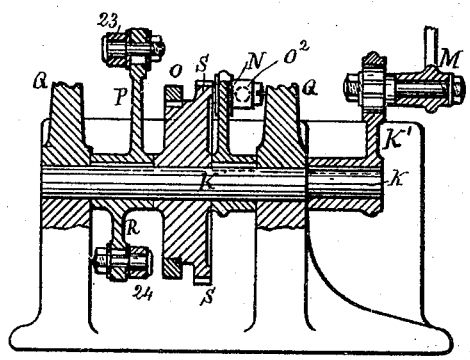
Figure 6:
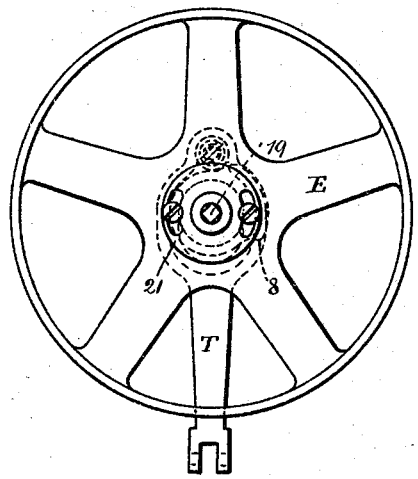

In the drawings, Figure 1 is an elevation of the machine, including the ginning-cylinder. Fig. 2 is a plan view. Fig. 3 is a cross-section at the line x x of Fig. 1. Fig. 4 is a partial longitudinal vertical section. Fig. 5 is an elevation of the rock-shaft and a cross-section of the parts that are supported by the same. Fig. 6 is an elevation of the pulley and the means for adjusting the cams. Fig. 7 is a detached view of the device for cutting the slots in the wire. Figs. 3 to 7 are in larger scale than Figs. 1 and 2. Fig. 8 is a side view, and Fig. 9 a cross-section, of the triangular wire. Fig. 10 is an inverted plan of the straightening device.

The wire 2 has a narrow base and a thin vertical body. It is preferably triangular, but it may be ⊥-shaped, and the teeth are cut in the thinner upper edge, the slots being of suitable width, and the point of each tooth is bent down slightly, so that the heel of the tooth projects higher than the point of the tooth, as set forth in my aforesaid patent.

The base A of the machine rests upon any suitable case or support, B, and D is the driving-shaft, upon which are the driving-pulleys W, the pulley X', for a band to the wheel E, and the grooved pulleys Z Y, for bands that drive the cutters and emery-cylinder, respectively, as hereinafter set forth.

At one end of the bed A is a hardened-steel plate, V, having a hole through it corresponding in shape to the triangular wire 2, and through this hardened-steel plate the wire is drawn by the machine, and there is a grooved roller, 3, under which the wire passes, and the groove corresponds to the sectional shape of the wire. This roller 3 is supported at one end of the box F, and beneath this box and upon the bed A is the straightener-plate 5, having a concave indentation beneath the roller 3, so that said roller acts with the steel plate V to straighten the wire as it is unreeled and take out any twist in the same. Within this box F, and projecting downwardly from the same, are two pairs of rollers, 6, with their lower ends conical. These act at opposite sides of the wire 2 to hold the same in line as it is drawn along with its base resting upon the plate 5, and there is a spring, 7, with a notched end resting upon the triangular wire adjacent to the cutters, for holding and guiding such wire to the clamp or gripping-jaws. There are two similar pendent rollers, $a\ a$, below the disk $b$, that is recessed into the under side of the box F and held by a clamp-nut, $b'$. These rollers press at opposite sides of the wire and act with the pairs of rollers 6 6 to effectually straighten the wire.

Upon the bed A is a gripping-clamp, G, made in two parts, one portion of which is stationary, and the other portion is upon a right-angled lever, G', (see Fig. 3,) that is actuated by a cam, 8, that is rotated by the wheel E, and this gripping-clamp G is opened at the time the wire is drawn along, and it is closed to hold the wire firmly while the slots are cut in the same, and the top edge of the wire projects sufficiently above the clamp for the slots to be cut to the desired depth.

The cutters made use of are in the form of circular saws 9 upon the arbor 17, which is revolved by a belt passing from the pulley Y over the idler-pulleys 18 and around the wheel H', and I prefer to use three or more of these rotary cutters 9, so as to cut three or more slots simultaneously and form the intermediate teeth. These slots are at an inclination, and the arbor 17 is at right angles thereto; hence the cutters 9 are of different sizes in the form of a cone, and the arbor 17 is in a cutter-head, H, that is provided with a slide that moves in the stock H², that is supported by a standard, H³, upon the bed A. It is preferable to make use of a tubular arm, H⁵, extending from stock H² through the standard H³, so that the stock H² can be set with the arbor 17 at the desired inclination and clamped by the bolts H⁴, Fig. 3. This also allows the cutter-head to be partially revolved to facilitate the insertion or removal of the saws or cutters.

The shaft 19 passes through the tubular arm H⁵, and at the end thereof is a square receiving plate or disk 21, and this is bolted to the hub of the wheel E, and within this hub is the sleeve 20, keyed to the hub and receiving the cam 8, that acts upon the link T and gripping-lever G', the sleeve revolving around the tubular arm H⁵, and the shaft 19 revolving within that arm.

Upon the end of the shaft 19 and in a recess in the stock H² is the grooved cam 10, and in the head-stock H is a slide, U, carrying a stud and roller within the groove of the cam 10, and this slide U is connected to the cutter-head H by a screw, (see Fig. 7,) so that the parts can be adjusted to regulate the depth of cut and to compensate wear in the cutters 9. This cam 10 slides the cutter-head H in the head-stock H², and causes the cutters to move toward and from the triangular wire, and the parts are timed so that the feed of the wire takes place after the cutters have been raised above the wire by the action of the cam 10.

Upon reference to Fig. 6 it will be seen that the slots in the plate 21 allow for adjusting the parts so as to time the action of the gripping-clamp G and the cam 10. The part of the wire 2 that has had the teeth cut in it is polished by the action of an emery-tube, I, upon an inclined arbor, I', that is driven by a band from the pulley Z. The wire passes across the end of this emery-tube I, to have any burrs removed therefrom, and the parts can be adjusted so as to set the emery-tube farther along on its shaft as the end wears away.

Upon the bed A there is a dovetailed block receiving the slide J', that carries the hinged feeding-pawl J, the end of which is provided with one or more plates that pass into the notches between the teeth upon the wire, and to this slide J' a reciprocating movement is communicated, as hereinafter described.

K is a rock-shaft having an arm, K', at the end of which one end of the connecting-rod M is adjustably pivoted, and there is an eccentric or cam, M², upon the sleeve 20, that gives to this rod M and rock-shaft K the required movement.

Upon the rock-shaft K is a wheel, O, having a roughened surface, upon which the wire 2 rests, and adjacent to this there is a ratchet-wheel, S. The wheel O and ratchet-wheel S turn freely upon the shaft K, and there is an arm and pawl, N, moving with the rock-shaft K and giving motion to the wheel O, and there is also a connection, O², from the arm N to the slide J', so that the said slide and pawl and the ratchet-wheel move simultaneously in drawing the wire along.

An arch-frame, Q, extending above the bearings of the rock-shaft K, supports a vertically-sliding jaw, L', having at its lower end the indenting-roller L, and the screw L² acts upon a spring above the sliding jaw L' to press the indenting-roller upon the teeth as they pass beneath it, and in so doing the points of the teeth upon the wire 2 are bent downwardly, for the purposes mentioned in my aforesaid patent; hence the wire, as it is delivered from between the wheel O and indenting-roll L, is complete and ready to be wound upon the ginning or carding cylinder C. This cylinder C is of metal and the surface turned off true, and the shaft C' of this cylinder is supported in the bearings or standards 14 and 15, and there is a tubular screw, 13, slipped over the shaft C' and held thereto by a set-screw, and this tubular screw passes through a nut in the standard 14, and the pitch of this screw corresponds to the width of the base of the wire as wound upon the cylinder.

One end of the wire 2 is passed through a hole in the cylinder C and secured preferably by a clamp and spring to take any slack in the wire, and the cylinder itself is revolved progressively at the same time that the wire is fed along. To effect this object the arms P and R project from and are moved by the rock-shaft K, and in slots in the outer ends of these arms there are adjustable crank-pins, and the rods 23 and 24 extend to the friction-clamps 11 and 12, that are formed of short levers, each having a sheet-metal band around the cylinder C. The lever of the clamp 12 is made as a spring, and it serves to hold the cylinder C upon the backward movement of the rod 23, which occurs at the same time that the pawl J is moved back, and this rod 23 and friction-clamp 11 turn the cylinder C and wind the toothed wire thereon at the same time that the wire is drawn through the machine by the feeding-pawl J and wheel O, thus winding the toothed wire upon the ginning or carding cylinder simultaneously with the manufacture of such toothed wire, and when the cylinder has been covered the outer end of the wire is to be passed into a hole in the cylinder and securely fastened.

I claim as my invention—

1. The combination, in a machine for making a toothed wire, of a straightening mechanism, a cutter-head, and a gang of revolving cutters at an inclination to the wire, a feeding-pawl acting to move the wire along progressively, and mechanism, substantially as specified, for revolving the cutters and moving the pawl and cutter-head, so that the cutters are brought into action upon the edge of the wire to notch the same and withdrawn, and then the feed takes place, substantially as specified.

2. The rotary cutters 9, of varying diameters, in combination with the arbor 17, placed at an inclination to the wire to be notched, the cutter-head and stock, the cam 10, for moving the same, and the gripping-clamp for holding the triangular wire while the cutters act upon the same, substantially as set forth.

3. The combination, with the cutters 9 and arbors 17, of the cutter-head H, stock $H^2$, tubular arm $H^5$, and the standard $H^3$, supporting the same, the shaft 19, passing through the tubular arm, the cam 10, to move the cutter-head, the sleeve 20, cam 8, yoke T, gripping-jaws G, and lever G', substantially as set forth.

4. The combination, in a machine for cutting teeth in a triangular wire, of revolving cutters and mechanism for moving the same, gripping-jaws for holding the wire while the cutters are acting on the same, and a revolving emery-tube for polishing off inequalities in the wire, substantially as set forth.

5. The combination, with the cutters for cutting teeth in a triangular wire, of a wire-feeding pawl, a wheel over which the wire passes, an indenting-roll, and a ratchet-wheel and connections for giving motion to the respective parts, substantially as set forth.

6. The combination, with the mechanism for cutting the teeth in a triangular wire and for feeding such wire along through the machine, of feeding and retaining clamps for revolving the cylinder upon which the wire is wound, and a screw for giving end motion to the cylinder as the winding progresses, substantially as set forth.

7. The combination of the guide-plate V, through a hole in which the triangular wire passes, with the grooved roller 3, the straightening-plate 5, the pairs of rollers 6 6, and the rollers $a\ a$, disk $b$, supporting the same, the box F, and the clamping-screw for holding the disk after the parts have been adjusted for straightening the wire, substantially as set forth.

Signed by me this 19th day of March, A. D. 1887.

DANIEL B. HASELTON.

Witnesses:
  W. GIBBES WHALEY,
  J. BACHMAN CHISOLM.